US009185077B2

(12) United States Patent
Robb et al.

(10) Patent No.: US 9,185,077 B2
(45) Date of Patent: Nov. 10, 2015

(54) ISOLATION PROXY SERVER SYSTEM

(71) Applicant: Verizon Patent and Licensing Inc., Basking Ridge, NJ (US)

(72) Inventors: Terence A. Robb, Colorado Springs, CO (US); William M. Lacey, Colorado Springs, CO (US); William J. Wofford, IV, Colorado Springs, CO (US); James R. Lehmpuhl, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/089,347

(22) Filed: Nov. 25, 2013

(65) Prior Publication Data

US 2015/0150113 A1 May 28, 2015

(51) Int. Cl.
*H04L 29/06* (2006.01)
*H04L 29/08* (2006.01)

(52) U.S. Cl.
CPC ........... *H04L 63/0281* (2013.01); *H04L 67/28* (2013.01)

(58) Field of Classification Search
CPC .. H04L 63/02; H04L 63/0281; H04L 63/0209
See application file for complete search history.

(56) References Cited

U.S. PATENT DOCUMENTS

2002/0161904 A1 * 10/2002 Tredoux et al. ............... 709/229

* cited by examiner

*Primary Examiner* — Izunna Okeke

(57) ABSTRACT

An isolation proxy server system separates a typical proxy server or reverse proxy server into two physical computing platforms. A first physical platform, a front end proxy server, receives requests from clients on an external network, but is unable to relay requests by originating corresponding requests on an internal network. A second physical platform, a back end proxy client, originates distinct work requests to the front end proxy server. The front end proxy server forwards client requests to the back end proxy client in responses to the distinct work requests it receives from the back proxy client. The back end proxy client relays the client requests to a target server. Thus, the front end proxy server may not originate new requests to the server(s) in the protected zone, and the back end proxy client may not receive new requests from clients or from the front end proxy server.

20 Claims, 3 Drawing Sheets

ISOLATION PROXY SERVER SYSTEM

BACKGROUND

In a client-server computing environment, an end user of a client computing device may initiate a request for a service provided by another computing device acting as a target server. For example, an end user may use a web browser client on a PC to request a web page. The web page may be stored on a web server and delivered to the PC in response to the request. The web browser may then render the received response on the PC for the end user.

In the client-server computing environment described above, the request from the client contains addresses associated with the client and the target server. Likewise, the response contains addresses associated with the client and the target server. In this way, the target server knows where the request came from; and the client knows where the response came from. If the target server becomes compromised by an attacker, however, the attacker may be able to acquire the client's address and direct an attack at the client. In a similar fashion, when the target server's address is publically known, the target server becomes much more susceptible to attack.

A typical proxy server provides enhanced security to clients in a client-server environment by hiding the clients' real addresses behind the address of the proxy server. The proxy server receives requests from the clients for services provided by target servers. The proxy server then relays the requests on behalf of the clients to the corresponding target server as if the requests originated from the proxy server, by replacing each client address with the address of the proxy server. In this way, the requests appear to be from the proxy server, and the corresponding target server is unaware of the individual clients. This allows the clients some protection from attacks originating from the target servers or other sources outside of the proxy server's internal network.

In a similar fashion, a reverse proxy provides protection to one or more target servers by receiving requests from clients on behalf of the target servers. Clients send their requests to the address of the reverse proxy server, which in turn replaces the address of the reverse proxy server with the address of the corresponding target server and relays the request to the corresponding target server. As such, individual addresses of the target servers are not publically known, and the target servers are better protected.

Hence, proxy servers provide protection for clients and reverse proxy servers provide protection for target servers by obscuring the existence of the clients and target servers, respectively. An attacker is unable to attack an unknown victim (client or target server). Proxy servers and reverse proxy servers, however, are vulnerable to attack and, once compromised, may be used by an attacker to reach the clients and target servers that were once obscured. This is possible because typical proxy servers and reverse proxy servers may originate a request to a client or target server, respectively, without receiving a corresponding request from an outside source.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
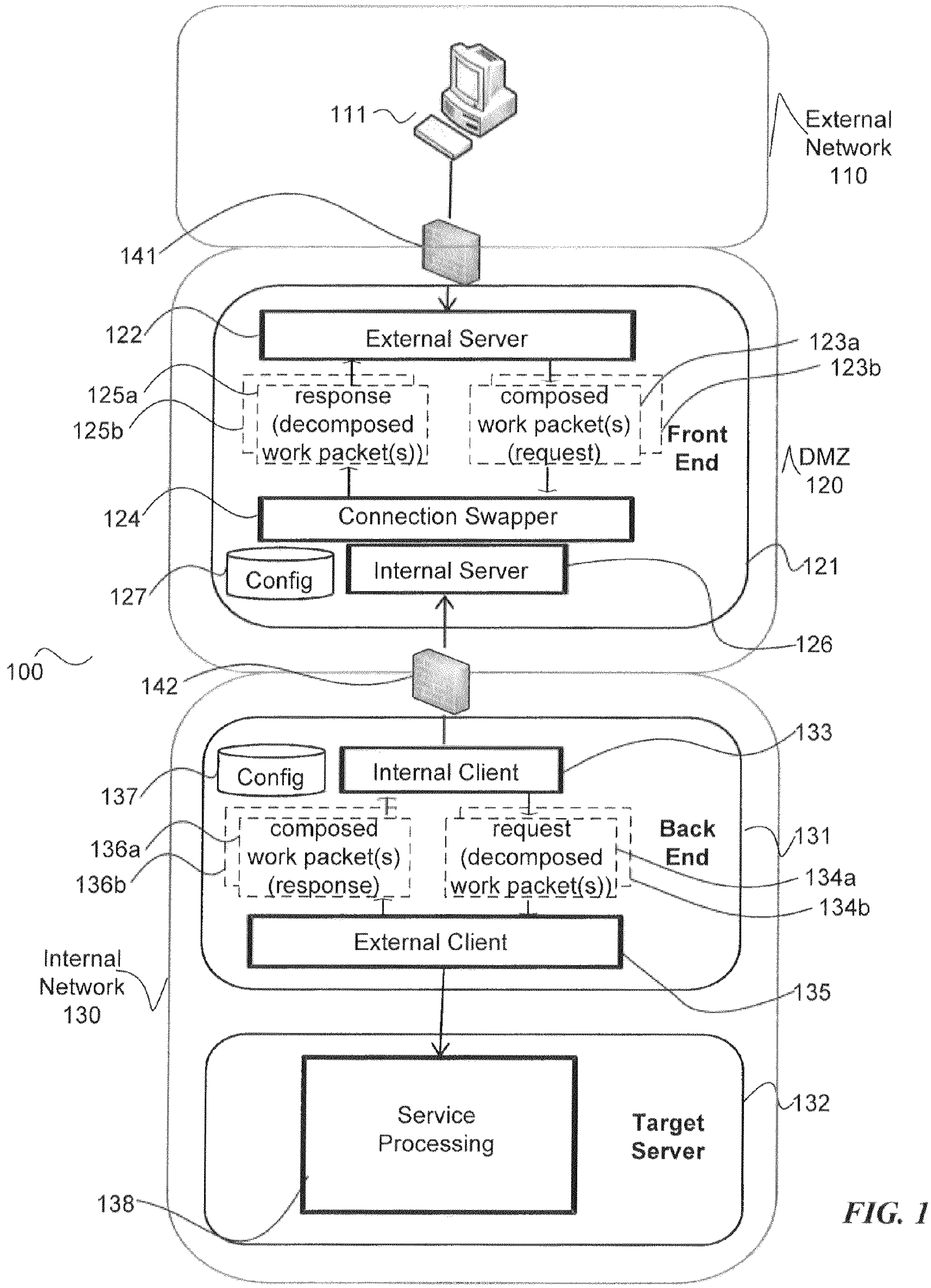
FIG. 1 is a high-level functional block diagram of an example of a system of proxy servers that provide proxy services and support an example of a proxy isolation system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level without detail, in order to avoid unnecessarily obscuring aspects of the present teachings.

A need exists for a system that provides proxy services without allowing a front-end proxy server to originate any request.

The various examples disclosed herein relate to an isolation proxy server system that separates a typical proxy server or reverse proxy server into two physical computing platforms. One physical computing platform functions, for example, as a front end proxy server that receives a user request from a user client on an external network, but is unable to relay the user request by originating a corresponding new request on the internal network. The other physical computing platform functions, for example, as a back end proxy client and originates a distinct request from the back end proxy client to the front end proxy server.

The front end proxy server may then, for example, forward the received user request from the user client to the back end proxy client as a response to the distinct request received from the back end proxy client. The back end proxy client then relays the user client request to a target server in a traditional fashion. The target server, for example, processes the user request and returns a response in a traditional fashion to the back end proxy client. The back end proxy client then returns the response from the target server to the front end proxy server, as a new request, and the front end proxy server delivers the response to the user client.

A computer or the like running a server program, for convenience, is often itself referred to as a server, a server computer or a server platform. Conversely, another computer or the like that runs a client program for consuming the particular service offered by a server is often itself referred to as a client, a client computer or a client device.

A server is typically implemented as a server application program running on the computer or other platform that is to be configured to offer the service, whereas the client is typically implemented as a client application program running on the device that is to be configured to consume the service. In many cases, the client applications run on end users' equipment, such as terminals or mobile devices that communication with the computer(s) running the server program, via a network. For some purposes, however, a client and server may run in the same device and/or a device that is a server for one purpose may be a client of another server for some other purpose. For convenience, the description that follows may often use the term server to broadly represent a data processing device used to run the applicable server programming. Such devices typically utilize general purpose computer hardware with appropriate network communication capabilities, to perform server processing and to perform attendant communications via one or more networks. The hardware elements of such server computers may be conventional in nature.

A proxy is a specialized type of server that receives a request form a client and relays the request to an intended target server while replacing the client address with the address of the proxy server, so that the request appears to come from the proxy. A reverse proxy is another specialized type of server that operates in a reverse fashion to a proxy. That is, the reverse proxy receives a response from a target server and relays the response to an intended client while replacing the target server address with the address of the proxy server.

A demilitarized zone (DMZ) is a network segment or segments wherein attacks and malicious traffic from an external network are anticipated and security measures are implemented to minimize the impact of attacks and malicious traffic on an internal network. A network is considered external to an entity or organization when the entity or organization does not have control over the network. A network is considered internal to an entity or organization when the entity or organization does have control over the network. As such, the DMZ functions as a buffer between an external network for which an entity or organization lacks control and an internal network for which an entity or organization has control and desires protection. In addition, server(s) located within the DMZ may be isolated from other server(s) or system(s) in that the DMZ server(s) may only communicate with the other server(s) or system(s) in a predefined fashion and/or in compliance with predefined rules.

Further, a system may have a front end component and a back end component. That is, in a system, users or equipment in an external network may only interact with a front end component. In a similar fashion, servers and/or terminal equipment in an internal network may only interact with a back end component. A DMZ system, then, requires the front end component and the back end component to interact, for example, in order to facilitate communications between end users in the external network and servers in the internal network.

The isolation proxy server system may enhance security, for example, because the front end proxy server may only respond to corresponding requests for resource(s) received from both the external and internal networks, but may not originate any requests. For example, any communication destined for the external network from the front end proxy server must only be in response to a request received from that network. Similarly, any communication destined for the internal network from the front end proxy server must only be in response to a request received from that network. Conversely, the back end proxy client may only originate requests to the front end proxy server and target servers, but may not receive any requests originated from either the external or internal networks. Thus, even if the front end proxy server were compromised, for example, an attacker would not be able to originate an attack.

Reference now is made in detail to the examples illustrated in the accompanying drawings and discussed below. FIG. 1 illustrates an example of the isolation proxy server system 100 including an external network 110, a DMZ 120, and an internal network 130.

Figure 4:
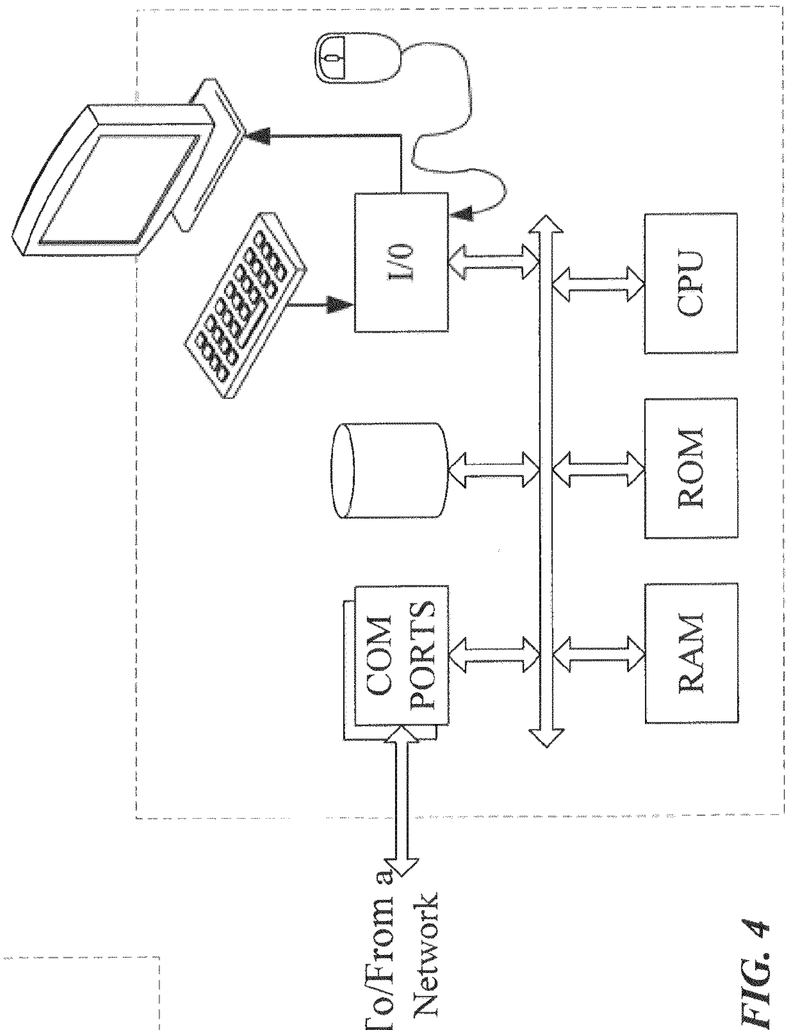
FIG. 4 is a simplified functional block diagram of a personal computer or other work station or terminal device.

The external network 110 may be, for example, the Internet or an intranet. In addition, the external network 110 may be a wide area network (WAN) or a local area network (LAN). The external network 110 may, for example, have at least one client 111. Client 111 may be, for example, a client computer, such as depicted in FIG. 4 and further described below. The client 111 may connect to the external network 110 via any convenient available wired or wireless network communications technology. Such a wired network communications network technology may be, for example, Ethernet over cable or optical fiber; and such as wireless network communications technology may use, for example, Wi-Fi or cellular data communications.

Figure 3:
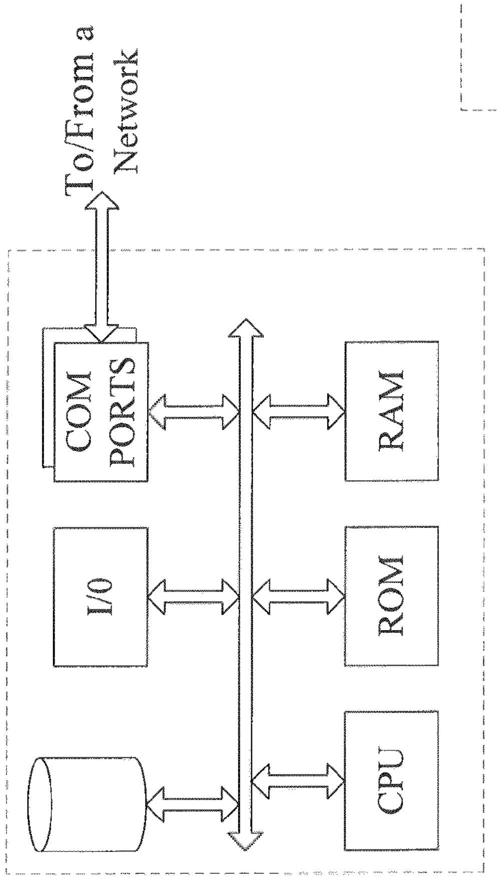
FIG. 3 is a simplified functional block diagram of a computer that may be configured as a host or server, for example, to function as the front end proxy server in the system of FIG. 1.

The internal network 130 may be a LAN or WAN. For example, the internal network 130 may be a LAN located within a data center or some other enterprise facility. The internal network 130 may provide communications for or include, for example, one or more target servers 132. The target server 132 may be, for example, a host computer platform, such as depicted in FIG. 3 and further described below. The target server 132 may connect to the internal network 130 via wired or wireless network communications media. Such wired network communications may be, for example, Ethernet over cable or optical fiber.

Although DMZ 120 may be a single hardware platform, the DMZ 120 may be a number of hardware devices connected to form or via a network, for example, a LAN or WAN. For example, the DMZ 120 may be a LAN located within the same data center or other enterprise facility as the internal network 130. Alternatively, the DMZ may be located within a different data center or other enterprise facility than the internal network 130. The DMZ 120 is intended, for example, to provide a buffer between the external network 110 and the internal network 130.

The client 111 may, for example, run an application that makes requests for a service intended to ultimately be serviced by the target server 132 located within internal network 130. The application running on the client 111 may be, for example, a web browser and the target server 132 may, for example, implement service processing 138. Such service processing 138 may be, for example, a web server. The client's service request may be, for example, an HTTP request. Although the examples below utilize a web browser, web server, and HTTP request, the isolation proxy server system and methodology are not restricted to such application or request. For example, the provided service may be a streaming media service or a file download service. In such alternate examples, the request may be a real time protocol (RTP) or file transfer protocol (FTP) request. In addition, the application running on the client 111 may be a standardized end user application, a customized end user application, or any client-server application that requests a service from the target server 132 and receives a response from the target server 132.

The isolation proxy server system 100 may further include a front end proxy server 121 located within the DMZ 120 and a back end proxy client 131 located within the internal network 130. The front end proxy server 121 and the back end proxy client 131 may be, for example, host computer platforms, such as depicted in FIG. 3 running appropriate programming as further described below. The front end proxy server 121 may communicate with or via the network of the DMZ 120 and with the back end proxy client 131 via internal firewall 142. The back end proxy client 131 may communicate with other elements of the internal network 130. Such communication may be, for example, via wired or wireless network communications. The wired network communications may be, for example, Ethernet over cable or optical fiber.

The front end proxy server 121 may include an external server 122, a connection swapper 124, and an internal server 126, as described in further detail below. The back end proxy client 131 may include an internal client 133 and an external client 135, as described in further detail below. The front end proxy server 121 and the back end proxy client 131 each includes a configuration file 127, 137. Each configuration file 127, 137 contains rules that control how the various elements of front end proxy server 121 and back end proxy client 131 interact, as described below.

In the examples, as detailed further below, the external server 122 composes work packet(s) 123*a*, 123*b* that encapsulate request(s) for service from client 111 and decomposes work packet(s) 125*a*, 125*b* to receive encapsulated response(s) to the request(s) for service for sending service response to the client 111. The external server 122, for example, composes work packet 123*a* by encapsulating (e.g. embedding) the original request for service from client 111 into a field within work packet 123*a*. In an example, a work packet includes a header for routing information an the like and a body for message content, and the field containing the request for service is the body field within work packet 123*a*. Likewise, external server 122, for example, decomposes a received work packet 125*a* to recover the encapsulated (e.g. embedded) service response (responsive to a service request) from a field within the received work packet 125*a*. In an example, the field is the body field within work packet 125*a*.

In the back end proxy client 131, the internal client 133 decomposes work packet(s) 134*a*, 134*b* to receive the encapsulated request(s) for service for relay to the target server 132 and composes work packet(s) 136*a*, 136*b* that encapsulate response(s) to the request(s) for service received from the target server 132.

In addition, the isolation proxy server system 100 may further include an external firewall 141 and an internal firewall 142. The external firewall 141, in the example, is between the DMZ 120 and the external network 110. The internal firewall 142, in the example, is between the DMZ 120 and the internal network 130. In this example, the client 111 communicates via the external network 110 with the front end proxy server 121 via the DMZ 120 only through the external firewall 141. Further in this example, the front end proxy server 121 communicates via the DMZ 120 with the back end proxy client 131 via the internal network 130 only through the internal firewall 142.

In the example of FIG. 1, the external firewall 141 provides protection to the DMZ 120 and the front end proxy server 121 from attacks or malicious traffic originating in the external network 110. In the illustrated example, the internal firewall 142 provides protection to the internal network 130, the back end proxy client 131, and the target server 132 from attacks or malicious traffic also originating in the external network 110 as well as originating in the DMZ 120.

In one example, the external firewall 141 is configured to only allow requests originating from the external network 110, such as client 111, and destined for the front end proxy server 121. In addition, the external firewall 141 is also configured to only allow responses from the front end proxy server 121 to the external network 110 that correlate to existing requests from the external network 110. As is common in most firewalls, external firewall 141 and internal firewall 142 correlate existing requests and responses by maintaining a table and/or database of parameters related to each request and each response (e.g. source and/or destination IP address, source and/or destination IP port, etc.). In this example, the external firewall 141 blocks any request from the external network 110 that is not destined for the front end proxy server 121. Also in this example, the external firewall 141 blocks any response from the front end proxy server 121 to the external network 110 that does not correlate to an existing request from the external network 110. Further in this example, the external firewall 141 also blocks any request from the front end proxy server 121.

In a similar example, the internal firewall 142 is configured to only allow requests originating from the back end proxy client 131 located within the internal network 130 and destined for the front end proxy server 121. In addition, the internal firewall 142 is also configured to only allow responses from the front end proxy server 121 to the back end proxy client 131 located within the internal network 130 that correlate to existing requests from the back end proxy client 131. That is, for example, the front end proxy server 121 only receives requests from the back end proxy client 131 and generates responses to the back end proxy client 131 that correlate to those existing requests. At the same time, in this example, the front end proxy server 121 will not originate any new requests (e.g. front end proxy server 121 can communicate in response to requests from, but cannot originate any new communication with, back end proxy client 131). Likewise, in this example, the back end proxy client 131 will only generate new requests to the front end proxy server 121 and receive responses from the front end proxy server 121 that correlated to those existing requests. Further in this example, the back end proxy client 131 does not receive any new requests.

The isolation proxy server system 100, when configured as described in the previous examples, isolates the internal network 130 by eliminating the need and/or ability of the internal network 130 to receive any request from the external network 110 and/or the DMZ 120. In addition, the isolation proxy server system 100 provides additional security, for example, by translating or replacing the address of the target server 132 with the address of the front end proxy server 121 in responses sent out through the external network 110. Such address translation occurs, for example, in external firewall 141, internal firewall 142, front end proxy server 121, and/or back end proxy client 131.

Although FIG. 1 and the corresponding description above illustrate a single client 111, a single front end proxy server 121, a single back end proxy client 131, a single external firewall 141, a single internal firewall 142, an a single target server 132, this is only for simplicity in describing the isolation proxy server system 100. The isolation proxy server system 100 may include and/or communicate with more than one or each of these elements without changing the behavior of the isolation proxy server system 100.

For example, one or more front end proxy servers 121 may receive multiple request for multiple services provided by one or more target servers 132. In this example, each request may come from the same client 111 or different clients 111. The same client 111, for example, may send all requests to the same front end proxy server 121 or may send each request to a different front end proxy server 121. In addition, each front end proxy server 121, for example, may send all requests to the same back end proxy client 131 or may send each request to a different back end proxy client 131. Each back end proxy client 131, for example, may also send all requests to the same target server 132 or may send various requests to different target servers 132.

Typically, in such an example, each response is only returned to the source of each respective request. For example, the target server 132 would only return a response to the back end proxy client 131 from which the target server 132 received the respective request. In a similar fashion, the front end proxy server 121 would only send a response to the same back end proxy client 131 or the same user client 111 from which the front end proxy server 123 received the respective request.

With further reference to FIG. 1, the elements of the front end proxy server 121 and the back end proxy client 131 will now be described in relation to the flow of a request for a service from the client 111 to the target server 132 providing the service as well as a corresponding response to the request for the service from the target server 132 to the client 111.

Figure 2:
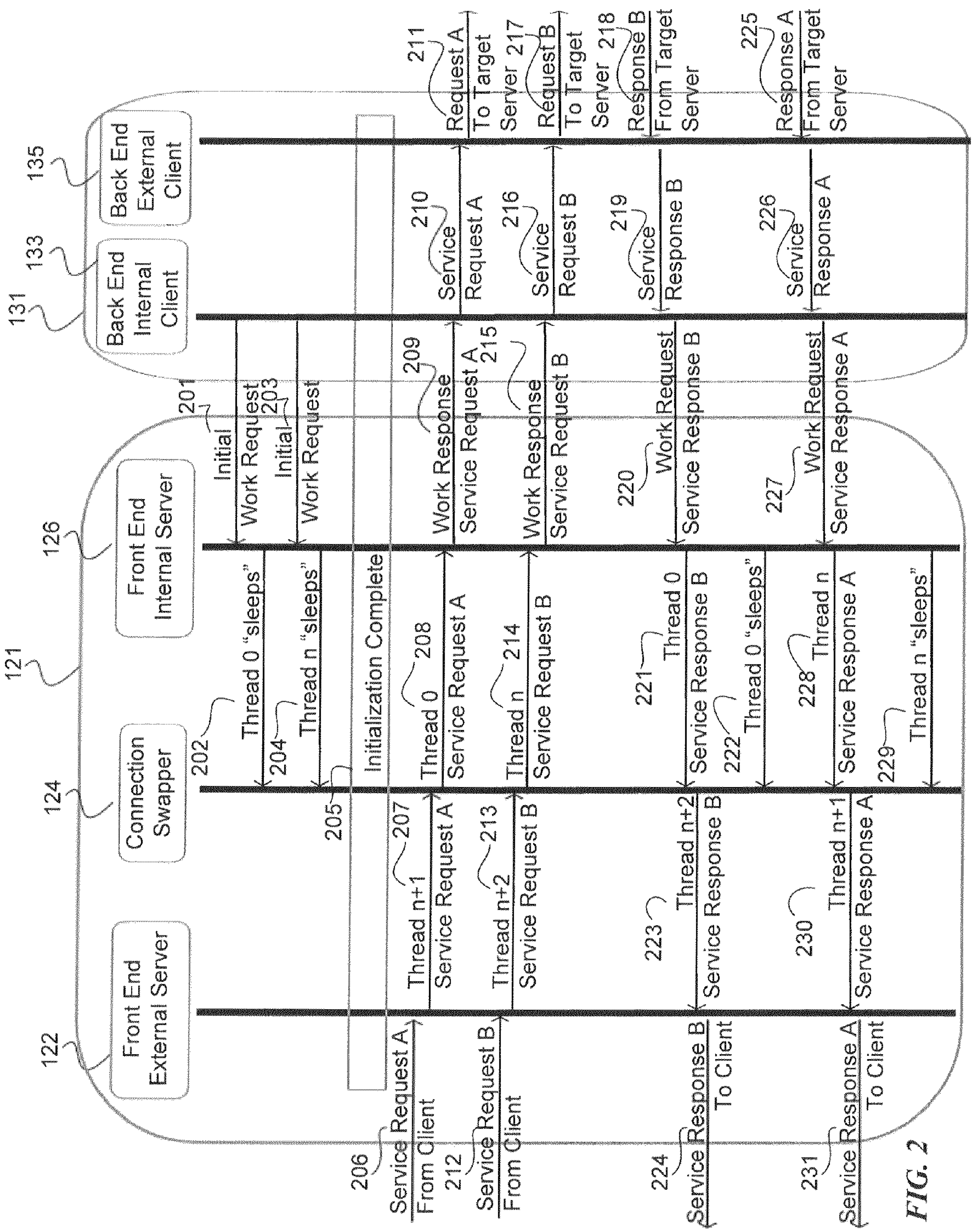
FIG. 2 is a high-level process flow of an example of a process of receiving service requests from a client, mapping front end internal server threads with front end external server threads by a connection swapper, exchanging work requests and work responses between a back end internal client and a front end internal server, and delivering service responses to the client, in a system like that of FIG. 1.

In the examples, a request for a service, or service request as referred to in FIG. 2, is a specific request from a client application to a target server to perform the specific service. Likewise, a response to the request for the service, or service response as referred to in FIG. 2, is a specific response from the target server containing the results of the target server performing the specific service.

In contrast, a request for work, or work request as referred to in FIG. 2, is a general request by a first element for work that needs to be performed from a second element within the isolation proxy server system 100. For example, the back end proxy client internal client 133 requests work from the front end proxy server internal server 126, as described further below. Similarly, a response to the work request, or work response as referred to in FIG. 2, is a general response by the second element to the first element containing the work to be performed. Continuing the example, the front end proxy server 126 responds to the work request form the back end proxy client internal client 133 with a composed work packet 123*a*, as described further below. In the examples, the composed work packet 123*a* encapsulates the service request from the client 111. As such, the work response contains the service request.

In the isolation proxy server system 100, as described in detail below, a work request may also contain work performed in response to a previously work response. Returning to the previous example, when the back end proxy client internal client 133 requests work from the front end proxy server internal server 126, the work request also contains a composed work packet 136*a*, as described further below. In the examples, the composed work packet 136*a* encapsulates a service response to a previous service request. As such, the work request may also contain a service response to a previous service request. That is, a work request is both a general request for work to be performed (e.g. a service request) as well as a specific response containing performed work (e.g. a service response).

FIG. 2 depicts the flow of request(s) for a service and response(s) to the request(s) for a service as well as the flow of work response(s) and work request(s) within the isolation proxy server system 100 in further detail. In the examples, configuration file 137 of the back end proxy client 131 contains one or more rules that allow or deny the back end proxy client internal client 133 to send work requests to or receive work responses from the front end proxy server internal server 126. Additionally, configuration file 137 of the back end proxy client 131 contains, for example, one or more rules that allow or deny the back end proxy client external client 135 to send service requests to or receive service responses from target server 132. Similarly, configuration file 127 of the front end proxy server 121 contains one or more rules that allow or deny the front end proxy server internal server 126 to receive requests for work from or send responses to requests for work to the back end proxy client internal client 133. A number of the steps shown in FIG. 2 may be regulated by one or more rules in these configuration files 127, 137.

The isolation proxy server system 100 is initialized when the back end proxy client internal client 133 submits one or more initial request(s) for work 201, 203 to the front end proxy server internal server 126, as depicted in FIG. 2. For example, when the back end proxy client 131 is powered on or otherwise booted-up and the back end proxy client internal client 133 is launched, the back end proxy client internal client 133 will submit initial request(s) for work at 201, 203 to the front end proxy server internal server 126. Two initial work requests are shown by way of example. The back end proxy client internal client 133 may, based on configuration file 137, submit more than two initial work requests in order to improve performance. Each of the initial request(s) for work in steps 201, 203 may be, for example, an HTTP request. In this example, the front end proxy server internal server 126 is not able to perform any work until receipt of one or more initial request(s) for work from the front end proxy server internal client 133.

Each initial request for work prompts the front end proxy server internal server 126 to generate a corresponding initial internal thread of execution. Thread 0 and Thread n at steps 202, 204. More threads may be opened if the server receives more work requests before it processes requests and sends responses. A thread of execution is the smallest independently manageable sequence of programmed instructions. The front end proxy server 121 is, for example, a program. The external server 122, connection swapper 124, and internal server 126 are each, for example, program objects within the front end proxy server 121 program. A process within a computing platform, such as the front end proxy server 121, may contain multiple threads of execution which share memory and resources within the process. Program objects within a program, such as external server 122 and internal server 126, generate threads of execution. An additional program object, such as connection swapper 124, may exchange data between threads of execution generated by one program object, e.g. external server 122, and threads of execution generated by another program object, e.g. internal server 126. Such exchange of data by the front end proxy server connection swapper 124 is described in further detail below.

Once the initial request(s) for work are submitted in 201, 203 and the corresponding initial internal threads of execution are established at steps 202, 204, initialization is complete 205. Once initialization is complete, the back end proxy client internal client 133 awaits a response to the initial request(s) for work and the initial internal threads of execution sleep until the front end proxy server connection swapper 124 is ready to exchange data with the internal threads of execution.

At this point in the process example of FIG. 2, the front end proxy server external server 122 may, for example, receive a request A for the service provided by the target server 132 from the client 111 at step 206. For purposes of an example to consider here, we will assume that the client 111 requests a web page stored on the target server 132. Receipt of such a service request prompts the front end proxy server external server 122 to compose a work packet 123*a* by encapsulating the received service request A as part of step 207.

The composed work packet 123*a* contains, for example, a unique ID and work package version number. In an example, over time, the work packet format may be changed. Each work packet format, in this example, has a new version number assigned. As such, the work packet version number defines, for example, which version or format of work packet is currently being implemented. The composed work packet 123*a* also contains a mode indicating the contents of the composed work packet 123*a*. The mode may be, for example, one of: empty, request, response, keepalive, heartbeat, or DirectData. A keepalive work packet, for example, is exchanged to maintain an existing session between the front end proxy server 121 and back end proxy client 131. A heartbeat work packet, for example, is sent from one element (e.g. the front end proxy server 121) to the other element (e.g. the back end proxy client 131) to determine if the other element is still functioning. In some examples, the front end proxy server 121 and the back end proxy client 131 need to exchange information unrelated to a specific service request or response, in which case a DirectData work packet is used. The composed work packet 123*a* also contains various properties from the received client request including the target URL, HTTP method, HTTP headers and parameters, as well as the service request itself.

In the example of FIG. 2, the front end proxy server external server 122 then generates a new external thread of execution, Thread n+1 on the external side of the front end proxy server connection swapper 124 (at step 207), based on service request A received from client 111; and front end proxy server external server 122 submits a composed work packet 123*a* to the front end proxy server connection swapper 124 via that Thread n+1. The front end proxy server connection swapper 124 receives the composed work packet 123*a* in the Thread n+1 in step 207, records that unique ID of the composed work packet 123*a*, and wakes up one of the initial internal threads of execution, for example Thread 0, to deliver the composed work packet 123*a* to the front en proxy server internal server 126 at step 208. When the initial internal thread of execution, Thread 0 in this example, wakes up, the front end proxy server internal server 126 generates, for example, a work response at 209 in response to the initial request for work from step 201. The work response contains the composed work packet 123*a* composed as part of step 207. The work response at 209 may be a HTTP response to the initial request for work 201 HTTP request. The front end proxy server internal server 126 submits, for example, the work response containing work packet 123*a* to the back end proxy client internal client 133 as part of step 209. The work request submitted at 209 thus includes the client server request A.

In a fairly high traffic implementation, new requests for service sometimes arrive before earlier service requests are fully serviced. To illustrate by way of example, at about the same time, the front end proxy server external server 122 receives another request B for service from the client 111 or elsewhere on the external network 110 at 212. The additional request B, for example, may be a request for another web page provided by target server 132. The front end proxy server external server 122 composes another work packet 123*b* containing service request B, generates another thread of execution (Thread n+2), and submits the other composed work packet 123*b* to the front end proxy server connection swapper 124 at step 213. The front end proxy server connection swapper 124, in such an example, records the unique ID of the other composed work packet 123*b* and wakes the other initial internal thread of execution (Thread n) to deliver the other composed work packet 123*b* to the front end proxy server internal server 126 at step 214. When the other initial internal thread of execution, Thread n in this example, wakes up, the front end proxy server internal server 126 generates, for example, a work response at step 215 in response to the initial request for work 203. The work response contains the other composed work packet 123*b* composed as part of step 213. The work response submitted at step 216 thus includes the client service request B. Alternatively, as discussed below, the other composed work packet 123*b* and/or subsequent composed work packet(s) 123*a*, 123*b* may be delivered to the back end proxy client internal client 133 as a work response (not shown) to a subsequent work request, such as the work request generated in step 227, for example.

Returning to the flow relative to the original work response generated by the front end proxy server internal server 126 at step 209, the back end prosy client internal client 133 receives the work response, records the composed work packet 123*a*, and decomposes the work packet 123*a* resulting in the original request A 134*a* at step 210. The back end proxy client internal client 133 also passes the service request A to the back end proxy client external client 135 as part of step 210 and the back end proxy client external client 135 then submits the service request A to the target server 132 at step 211.

In a similar fashion, the back end proxy client internal client 133 receives the work response containing the other composed work packet 123*b* generated at step 215, records the other composed work packet 123*b* unique ID, and decomposes the other work packet 123*b* resulting in the original service request B 134*b* at step 216. The back end proxy client internal client 133 then also passes the original service request B to the back end proxy client external client 135 as part of step 216 and the back end proxy client external client 135 submits the service request B to the target server 132 at step 217.

The service processing 138 by the target server 132 is dependent on various factors of the service that target server 132 is configured to offer; and the service processing 138 and the operations of the system 100 need not be particularly dependent on or limited by each other except with regard to the flow of communications outlined by way of example here. It is assumed for this example that service processing 138 may result in a service response B prior to a service response A, but this is not necessarily always the case. The target server performs service processing 138 and returns a service response B to the back end proxy client external client 135 at step 218. In the web request example, the service response B may be the requested web page of content. The target server also performs service processing 138 and returns a service response A to the back end proxy client external client 135 at step 225. For example, the original client service request A may be an HTTP request for a web page, the service processing 138 may be a web server, and the service response A may be the web page as an HTTP response.

The back end proxy client external client 135 receives the service response B and composes a new work packet 136*b* by encapsulating the service response B from the target server 132 at step 219. The back end proxy client external client 135 also receives the service response A and composes another work packet 136*a* by encapsulating the service response A from the target server 132 at step 226.

The new composed work packet 136*b* contains, for example, the unique ID recorded from the composed work packet 123*b* and a work packet version number. That is, the new work packet 136*b* corresponds, for example, to the received work packet 123*b*. The unique ID correlates the work response to a work request so that the work response may be identified by the front end proxy server connection swapper 124, as described in further detail below. The new composed work packet 136*a* also contains a mode indicating the contents of the new composed work packet 136*b*. The mode may be, for example, one of: empty, request, response, keepalive, heartbeat, or DirectData. The new composed work packet 136*b* also contains various properties of the service replay from the target server 132 including the HTTP response version, code and status; HTTP headers and parameters; and the service response B itself.

The back end proxy client internal client 133 then generates a new request for work containing the new composed work packet 136*b* and submits the new request for work to the front end proxy server internal server 126 at step 220. The back end proxy client internal client 133 also generates another new request for work containing the other composed work packet 136*a* and submits the other new request for work to the front end proxy server internal server 126 at step 227.

That is, service responses A, B from a target server 132 to existing client service requests A, B are passed from the back end proxy client internal client 133 to the front end proxy server internal server 126 as a new request for work in steps 220, 227. As a further example, the back end proxy client internal client 133 may generate new HTTP requests that are new requests for work and also contain the web pages, from prior examples, as HTTP responses encapsulated within the new composed work packets 136*a*, 136*b*, at steps 220, 227.

Although not shown in FIG. 2, in response to the new requests for work in steps 220, 227, the front end proxy server internal server 126 may, for example, submit subsequent composed work packets 123*a*, 123*b* from the initial internal threads of execution 202, 204 to the back end proxy client internal client 133. That is, subsequent client service requests are passed from the front end proxy server internal server 126 to the back end proxy client internal client 133 as work responses to existing requests for work, such as the work requests generated in steps 220, 227. In addition, the front end proxy server internal server 126 in this example may also submit the composed work packets 136*a*, 136*b* encapsulating the responses from the target server 132 contained in the new request for work generated in steps 220, 227 to the front end proxy server connection swapper 124 in the initial internal threads of execution (Thread 0 and Thread n).

It may be, for example, that the back end proxy client internal client 133 submits a subsequent request for work to the front end proxy server internal server 126 with a subsequent composed work packet 136*a* encapsulating a subsequent service response B from the target server 132 corresponding to a subsequent client request for service B before the front end proxy server internal server 126 receives the new composed work packet 136*a* corresponding to the initial client request A for service. That is, step 220 relates to a service response B and step 227 relates to service response A, even though service request A was received at step 209 before service request B was received at step 215. In such a case, the front end proxy server internal server 126 may, for example, submit the subsequent composed work packet 136*b* containing the service response B to the front end proxy server connection swapper 124 in Thread 0 even though Thread 0 did not deliver the composed work packet 123*b* containing the service request B from the front end proxy server connection swapper 124 to the front end proxy server internal server 126. That is, the initial threads of execution, Thread 0 and Thread n, may be used to exchange composed work packets 123*a*, 123*b* and composed work packets 136*a*, 136*b* between the front end proxy server internal server 126 and the front end proxy server connection swapper 124 that do not necessarily correspond to a correlated request for service and response to that request for service.

Returning to the examples, upon receipt of the new composed work packet 136*b* in the work request generated at step 220, the front end proxy server internal server 126 delivers the composed work packet 136*b* to the front end proxy server connection swapper 124 at step 221 via Thread 0. Thread 0 then returns to sleep and awaits another service request at step 222. In a similar fashion, upon receipt of the other composed work packet 136*a* in the work request generated at step 227, the front end proxy server internal server 126 also delivers the other composed work packet 136*a* to the front end proxy server connection swapper 124 at step 228 via Thread n. Thread n then also returns to sleep and awaits another service request at step 299.

The front end proxy server connection swapper 124 decomposes the work packet 136*b* at step 223, resulting in the original service response B 125*b*. As part of step 223, the front end proxy server connection swapper 124 also compares the composed work packet 136*b* unique ID with recorded unique IDs from composed work packets 123*a*, 123*b* to determine the appropriate thread of execution, Thread n+2 in this example, in which to submit the response B from the target server 132 to the front end proxy server external server 122. Likewise, the front end proxy server connection swapper 124 also decomposes the work packet 136*a* at step 230, resulting in the original service response A 125*a*. As part of step 230, the front end proxy server connection swapper 124 also compares the composed work packet 136*a* unique ID with recorded unique IDs from composed work packets 123*a*, 123*b* to determine the appropriate thread of execution, Thread n+1 in this example, in which to submit the response A from the target server 132 to the front end proxy server external server 122. That is, the front end proxy server connection swapper 124 utilizes, for example, the work packet unique ID of the new composed work packets 136*a*, 136*b* to determine a thread of execution. Thread n+1 or Thread n+2, that corresponds to a correlated request for service and response to the request for service such that the corresponding service response is returned to the appropriate user client 111.

Hence, FIGS. 1-2 and the corresponding descriptions above explain examples of an isolation proxy server system 100 and operation of such a system 100. The front end proxy server external server 122 only receives requests for a service provided by the target server 132 from a client like user client 111 on the external network 110; and the front end proxy server internal server 126 only receives requests for work from the back end proxy client internal client 133. The front end proxy server internal server 126 forwards the received client requests for services provided by the target server 132 encapsulated in composed work packets 123*a*, 123*b* to the back end proxy client internal client 133 as work responses to requests for work originated by back end proxy client internal client 133. With the exception of the initial requests for work, subsequent requests for work from back end proxy client internal client 133 to front end proxy server internal server 126 may, whenever practical, carry composed work packets 136*a*, 136*b* encapsulating service responses from the target server 132. The front end proxy server connection swapper 124 maps composed work packets 136*a*, 136*b* encapsulating service responses form the target server 132 received by the front end proxy server internal server 126 from the back end proxy client internal client 133 with composed work packets 123*a*, 123*b* encapsulating service requests from client 111 so that the front end proxy server external server 122 may then delivery the correct service response to the client 111.

In a similar fashion, the back end proxy client internal client 133 only originates requests for work to the front end proxy server internal server 126 and receives client requests for services provided by the target server 132 from the front end proxy server internal server 126 encapsulated in composed work packets 123*a*, 123*b* as responses to the requests for work. In addition, the back end proxy client external server 135 only originates requests for service to the target server 132 based on the client requests for services provided by the target server 132 encapsulated in the composed work packets 123*a*, 123*b* and only receives service responses from the target server 132 corresponding to the client requests for services provided by the target server 132. The back end proxy client external server 135 composes work packets 136*a*, 136*b* encapsulating the service responses from the target server 132 corresponding to the client requests for services provided by the target server 132. The back end proxy client internal client 133 then forwards the composed work packets 136*a*, 136*b* encapsulating the service responses from the target server 132 corresponding to the client requests for services provided by the target server 132 to the front end proxy server internal server 126 in the requests for work.

As outlined above, isolation proxy server system 100 functions may be implemented by configuration of computer platforms as in the front end proxy server 121, the back end proxy client 131 and the target server 132 as well as the client 111. Such configuration typically entails programming for the processors. We have discussed examples of the various elements 121, 131, and 132, however, it may be helpful to briefly consider programmable computers, e.g. for server operations and/or for other types of end user or terminal devices.

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that the general structure and general operation of such equipment as shown in FIGS. 3 and 4 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and at a via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 4). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of the isolation proxy server system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangle memory of the computers, processors or the like, or associated modules thereof, such a various semiconductor memories, tape drives, disk drives and the like, which may provide non-transitory storage at any time for the software programming. All or portions of the software may at times be communicated through the Internet or various other telecommunications networks. Such communications, for example, may enable loading of the software from one computer or processor into another, for example, from a management server or host computer of a service provider into the computer platform of the isolation proxy server system that will be the front end proxy server and/or back end proxy client. Thus, another type of media that may bear the software elements includes optical, electrical and electromagnetic waves, such as used across physical interfaces between local devices, through wired and optical and landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the DIPS front end proxy server, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described therein. It is intended by the flowing claims to claim any and all applications, modifications and variations that fall within the true scope of the present teachings.

Unless otherwise states, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated in intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer, comprising:

a processor configured to control operations of the computer;

a memory; and a front end proxy server program in the memory comprising:

an internal server program object;

an external server program object; and a connection swapper program object, wherein:

execution of the front end proxy server internal server program object by the processor of the computer configures the computer to implement functions, including functions to:

(I) establish first threads of execution, wherein:

each first thread of execution is in response to a respective request for work from a back end proxy client internal client program object executing on a computer platform configured as a back end proxy client; and each first thread of execution sleeps while waiting to receive a request for a service provided by a target server from a user client to the front end proxy server external server program object;

(II) receive, by one of the first threads of execution and from the front end proxy server connection swapper program object, the request for the service received from the user client;

(III) forward, by the one of the first threads of execution and contained in a response to the respective request for work from the back end proxy client internal client program object, the request for the service received from the user client; and (IV) send, by another one of the first threads of execution and to the front end proxy server connection swapper program object, a response from the target server to the request for the service received from the user client upon receipt of the response from the target server to the request for the service received from the user client contained in another request for work from the back end proxy client internal client program object;

execution of the front end proxy server external server program object by the processor of the computer configures the computer to implement functions, including functions to:

(A) establish a second thread of execution in response to receipt of the request for the service from the user client;

(B) send, by the second thread of execution, the request for the service received from the user client to the front end proxy server connection swapper program object;

(C) receive, by the second thread of execution, the response from the target server to the request for the service received from the user client from the front end proxy server connection swapper program object; and (D) forward, by the second thread of execution and to the user client, the response from the target server to the request for the service received from the user client; and execution of the front end proxy server connection swapper program object by the processor of the computer configures the computer to implement functions, including functions to:

(i) associate the second thread of execution established by the front end proxy server external server program object with the one of the first threads of execution in receipt of the request for the service received from the user client and the other one of the first threads of execution sending the response from the target server to the request for the service received from the user client;

(ii) receive, from the second thread of execution established by the front end proxy server external server program object, the request for the service received from the user client;

(iii) send, to the one of the first threads of execution, the request for the service received from the user client;

(iv) receive, from the other one of the first threads of execution, the response from the target server to the request for the service received from the user client; and (v) send, to the second thread of execution, the response from the target server to the request for the service received from the user client.

2. The computer of claim 1, wherein the implemented function of the front end proxy server external server program object to send the request for the service received from the user client to the front end proxy server connection swapper program object further includes functions to:

compose a work packet comprising a unique ID, a work packet version number, a mode indicating the contents of the work packet, properties of the request for the service received from the user client, and the body of the request for the service received from the user client, wherein the composed work packet encapsulates the request for the service received from the user client.

3. The computer of claim 1, wherein the implemented function of the front end proxy server external server program object to receive the response from the target server to the request for the service received from the user client from the front end proxy server connection swapper program object further includes functions to:

decompose a work packet comprising a unique ID, a work packet version number, a mode indicating the contents of the work packet, properties of the response from the target server to the request for the service received from the user client, and the body of the response from the target server to the request for the service received from the user client, wherein the work packet encapsulates the response from the target server to the request for the service received from the user client.

4. The computer of claim 1, wherein the implemented function of the front end proxy server internal server program object to establish the first threads of execution further includes functions to:

establish, in compliance with a configuration file, each first thread of execution in response to the respective request for work from the back end proxy client internal client program object, wherein the configuration file comprises:

a rule to allow or deny the front end proxy server internal server program object to receive the respective request for work from the back end proxy client.

5. The computer of claim 1, wherein the one of the first threads of execution and the other one of the first threads of execution are a same thread of execution.

6. The computer of claim 1, wherein the one of first threads of execution and the other one of the first threads of execution are different threads of execution.

7. A non-transitory storage medium storing instructions executable by a device, wherein the instructions comprise instructions to:

execute a front end proxy server internal server program object to:

(I) establish first threads of execution, wherein each first thread of execution is in response to a respective request for work from a back end proxy client internal client program object executing on a computer platform configured as a back end proxy client;

(II) receive, by one of the first threads of execution and from a front end proxy server connection swapper program object, a request for a service received from a user client;

(III) forward, by the one of the first threads of execution and contained in a response to the respective request for work from the back end proxy client internal client program object, the request for the service received from the user client; and (IV) send, by another one of the first threads of execution and to the front end proxy server connection swapper program object, a response from the target server to the request for the service received from the user client upon receipt of the response from the target server to the request for the service received from the user client contained in another request for work from the back end proxy client internal client program object;

execute the front end proxy server external server program object to:

(A) establish a second thread of execution in response to receipt of the request for the service from the user client;

(B) send, by the second thread of execution, the request for the service received from the user client to the front end proxy server connection swapper program object;

(C) receive, by the second thread of execution, the response from the target server to the request for the service received from the user client from the front end proxy server connection swapper program object; and (D) forward, by the second thread of execution and to the user client, the response from the target server to the request for the service received from the user client; and execute the front end proxy server connection swapper program object to:

(i) associate the second thread of execution with the one of the first threads of execution in receipt of the request for the service received from the user client and the other one of the first threads of execution sending the response from the target server to the request for the service received from the user client;

(ii) receive, from the second thread of execution, the request for the service received from the user client;

(iii) send, to the one of the first threads of execution, the request for the service received from the user client;

(iv) receive, from the other one of the first threads of execution, the response from the target server to the request for the service received from the user client; and (v) send, to the second thread of execution, the response from the target server to the request for the service received from the user client.

8. The non-transitory storage medium of claim 7, wherein the instructions to send the request for the service received from the user client to the front end proxy server connection swapper program object further comprise instructions to:

compose a work packet comprising a unique ID, a work packet version number, a mode indicating the contents of the work packet, properties of the request for the service received from the user client, and the body of the request for the service received from the user client, wherein the composed work packet encapsulates the request for the service received from the user client.

9. The non-transitory storage medium of claim 7, wherein the instructions to receive the response from the target server to the request for the service received from the user client from the front end proxy server connection swapper program object further comprise instructions to:

decompose a work packet comprising a unique ID, a work packet version number, a mode indicating the contents of the work packet, properties of the response from the target server to the request for the service received from the user client, and the body of the response from the target server to the request for the service received from the user client, wherein the work packet encapsulates the response from the target server to the request for the service received from the user client.

10. The non-transitory storage medium of claim 7, wherein the instructions to establish the first threads of execution further comprise instructions to:

establish, in compliance with a configuration file, each first thread of execution in response to the respective request for work from the back end proxy client internal client program object, wherein the configuration file comprises:

a rule to allow or deny the front end proxy server internal server program object to receive the respective request for work from the back end proxy client.

11. The non-transitory storage medium of claim 7, wherein the one of the first threads of execution and the other one of the first threads of execution are a same thread of execution.

12. The non-transitory storage medium of claim 7, wherein the one of the first threads of execution and the other one of the first threads of execution are different threads of execution.

13. The non-transitory storage medium of claim 7, wherein to establish the first threads of execution, each first thread of execution sleeps while waiting to receive the request for the service provided by a target server from the user client to a front end proxy server external server program object.

14. A method performed by a device, the method comprising:

executing a front end proxy server internal server program object to:

(I) establish first threads of execution, wherein each first thread of execution is in response to a respective request for work from a back end proxy client internal client program object executing on a computer platform configured as a back end proxy client;

(II) receive, by one of the first threads of execution and from a front end proxy server connection swapper program object, a request for a service received from a user client;

(III) forward, by the one of the first threads of execution and contained in a response to the respective request for work from the back end proxy client internal client program object, the request for the service received from the user client; and (IV) send, by another one of the first threads of execution and to the front end proxy server connection swapper program object, a response from the target server to the request for the service received from the user client upon receipt of the response from the target server to the request for the service received from the user client contained in another request for work from the back end proxy client internal client program object;

executing the front end proxy server external server program object to:

(A) establish a second thread of execution in response to receipt of the request for the service from the user client;

(B) send, by the second thread of execution, the request for the service received from the user client to the front end proxy server connection swapper program object;

(C) receive, by the second thread of execution, the response from the target server to the request for the service received from the user client from the front end proxy server connection swapper program object; and (D) forward, by the second thread of execution and to the user client, the response from the target server to the request for the service received from the user client; and executing the front end proxy server connection swapper program object to:

(i) associate the second thread of execution with the one of the first threads of execution in receipt of the request for the service received from the user client and the other one of the first threads of execution sending the response from the target server to the request for the service received from the user client;

(ii) receive, from the second thread of execution, the request for the service received from the user client;

(iii) send, to the one of the first threads of execution, the request for the service received from the user client;

(iv) receive, from the other one of the first threads of execution, the response from the target server to the request for the service received from the user client; and (v) send, to the second thread of execution, the response from the target server to the request for the service received from the user client.

15. The method of claim 14, wherein to send the request for the service received from the user client to the front end proxy server connection swapper program object, the instructions further to:

compose a work packet comprising a unique ID, a work packet version number, a mode indicating the contents of the work packet, properties of the request for the service received from the user client, and the body of the request for the service received from the user client, wherein the composed work packet encapsulates the request for the service received from the user client.

16. The method of claim 14, wherein to receive the response from the target server to the request for the service received from the user client from the front end proxy server connection swapper program object the method further comprising:

decomposing a work packet comprising a unique ID, a work packet version number, a mode indicating the contents of the work packet, properties of the response from the target server to the request for the service received from the user client, and the body of the response from the target server to the request for the service received from the user client, wherein the work packet encapsulates the response from the target server to the request for the service received from the user client.

17. The method of claim 14, wherein to establish the first threads of execution, the method further comprising:

establishing, in compliance with a configuration file, each first thread of execution in response to the respective request for work from the back end proxy client internal client program object, wherein the configuration file comprises:

a rule to allow or deny the front end proxy server internal server program object to receive the respective request for work from the back end proxy client.

18. The method of claim 14, wherein the one of the first threads of execution and the other one of the first threads of execution are a same thread of execution.

19. The method of claim 14, wherein the one of the first threads of execution and the other one of the first threads of execution are different threads of execution.

20. The method of claim 14, wherein to establish the first threads of execution, each first thread of execution sleeps while waiting to receive the request for the service provided by a target server from the user client to a front end proxy server external server program object.

* * * * *